Oct. 2, 1956 H. L. HORWITZ ET AL 2,765,368
REVERTIVE CALL CIRCUIT
Filed Nov. 12, 1953 2 Sheets-Sheet 1

INVENTOR.
H. L. HORWITZ
G. L. HASSER
BY
AGENT

Oct. 2, 1956 H. L. HORWITZ ET AL 2,765,368

REVERTIVE CALL CIRCUIT

Filed Nov. 12, 1953

2 Sheets-Sheet 2

INVENTOR.
H. L. HORWITZ
G. L. HASSER

BY

[signature]

AGENT

United States Patent Office 2,765,368

Patented Oct. 2, 1956

2,765,368

REVERTIVE CALL CIRCUIT

Henry Leopold Horwitz, Nutley, and George Louis Hasser, Packanack Lake, N. J., assignors to International Telephone and Telegraph Corporation, New York, N. Y., a corporation of Maryland Application November 12, 1953, Serial No. 391,524

10 Claims. (Cl. 179—17)

This invention relates to a reverting call ringing circuit for automatic telephone switching systems.

In automatic telephone systems in which station lines are equipped for multi-station or "party line" working, certain of the party lines may be arranged for bridged ringing, whereas others may preferably be arranged for divided ringing.

Where the number of stations connected to a party line does not exceed four or five, it is common practice to provide at the exchange sources of alternating ringing current of four or five different frequencies and to equip each station with a ringer connected in bridge across the line conductors and tuned to respond to ringing current of one only of these frequencies, whereby the selection of a particular station on a party line is effected by selecting the frequency of the ringing current to be applied thereto. Thus, when a call is made from another line to a station on a multi-party line, the ringer at that station alone responds to the ringing current and no other party on the line is disturbed.

When it is desired to increase still further the number of stations connected to a party line, up to a maximum of eight or ten stations, it is usual, rather than to increase the number of ringing current sources at the exchange, to divide the stations into two groups, each station of a group having a ringer tuned to a different frequency, and to connect the ringers to the line according to one of two methods, depending upon the physical characteristics of the line.

According to the preferred method, applicable to lines having good insulation quality and not subject to interference from neighboring power or other lines, the ringers at the stations of one group are connected between one of the line conductors and ground and those of the other group between the other line conductor and ground, whereby the selection of a particular station on the line is secured by selecting both the frequency of the ringing current to be supplied to the line and the particular conductor thereof to which it shall be applied. In this case also, the ringer at only one station on a party line responds to the ringing current when a call is made to that station from another line.

According to the second method, applicable to lines having less favorable insulation quality and/or subject to interference if unbalanced with respect to ground, it is usual to connect the ringers at the stations of both groups in bridge across the line conductors and to distinguish between two stations, one in each group, having ringers tuned to the same frequency by assigning a different ringing "code" to each, for example, a "one-ring" code to the stations of one group and a "two-ring" code to those of the other group. This second method is subject to the obvious objection that two stations are "rung" when a call is made to either of them from another line, the party at one of the stations being unwanted and thus unnecessarily disturbed; for this reason, such a party line is often described as a semi-selective party line.

When a "reverting" call is made from a station on a multi-party line, that is, a call to another station connected to the same party line, it is common practice to require the calling party to replace his handset on the cradle after the completion of dialing, whereupon the exchange proceeds to apply the appropriate kind of ringing current to the party line to ring the called station, the ringing being "tripped" in the usual way when the called party answers the call. In order that the calling party may know when the answer occurs, and thus when he may himself lift the handset again and begin conversation, the exchange is arranged to apply two kinds of ringing current to the party line alternately, one kind to ring the called station, as stated, and one kind to ring the calling station; the calling party then lifts the handset when his own ringer ceases to respond.

However, when a semi-selective party line is involved, that is, one arranged for bridged ringing together with a choice of ringing codes in accordance with the second method described hereabove, a difficulty arises when a reverting call is made to the one other station on the line having a ringer tuned to respond to the same frequency as the ringer at the calling station. For, in that case, both ringers would respond to both ringing codes alternately and the called party might well fail to recognize, and therefore might disregard, his own ringing code. Accordingly, it is known practice to suppress the ringing code of the calling station when that station will in any case be rung by the ringing current directed at the called station.

It will be evident that, when the party line involved is one which is arranged for divided ringing in accordance with the first method described hereabove, the exchange must in no circumstances suppress the ringing of the calling station, even though the ringing frequencies assigned to both calling and called stations be the same. It follows that, unless the exchange, in order to handle reverting calls on party lines of both kinds, comprises means for determining whether the line involved in a particular reverting call is arranged for bridged or for divided ringing, the party lines in the exchange having more stations connected thereto than there are ringing current frequencies available are preferably all arranged either for bridged ringing or for divided ringing, an undesirable restriction of the flexibility of the exchange.

It is an object of our invention to provide a reverting call ringing circuit which may be taken into use when a call is made from a station on a party line to another station on the same line and which is arranged to select the proper ringing current frequencies for ringing both the calling and called stations, to determine whether the party line concerned is arranged for divided or for bridged ringing, and to apply the appropriate ringing currents to the line alternately in the proper manner.

A further object of our invention is to suppress the ringing code of the calling station from which a reverting call is being made if the ringing current frequency selected for ringing the calling station is the same as that selected for the called station and the party line concerned is arranged for bridged ringing.

A still further object of our invention is the provision of means for forced release of a reverting call ringing circuit if the call is neither answered by the called party nor cancelled by the calling party within a predetermined time-interval.

According to one feature of our invention, therefore, a reverting call ringing circuit is provided with means for determining whether a party line on which a reverting call is being made is arranged for divided or bridged ringing, and means responsive to impulses dialed by the calling party for applying ringing currents of the proper frequencies and to the proper side or sides of the line to ring the calling and called stations thereon alternately in the case that the party line concerned is arranged for divided ringing, and for applying to the line ringing current of the proper frequencies and interrupted at appropriate intervals to ring the calling and called stations thereon alternately in the case that the party line concerned is arranged for bridged ringing.

According to another feature of the invention, the dialed impulses constituting the "party" digits of the calling and called stations are caused to position respectively a pair of step-by-step switches in the reverting call ringing circuit, which switches select the frequencies of the ringing currents to be applied to the party line and determine the side or sides of the line to which they are to be applied in case the line is arranged for divided ringing, or the codes of the ringing currents in case the line is arranged for bridged ringing.

According to yet another feature of the invention, the switches in the reverting call circuit also cause the ringing current normally applied to the party line to ring the calling party to be suppressed if the frequency of the ringing current selected by the party digit of the called party is the same as that selected by the party digit of the calling party, provided the party line is one which is arranged for bridged ringing, but not if it is arranged for divided ringing.

The above-mentioned and other objects and features of our invention will be clearly understood from a consideration of the following description of a preferred embodiment thereof, taken in conjunction with the accompanying drawings, in which.

Figure 2:
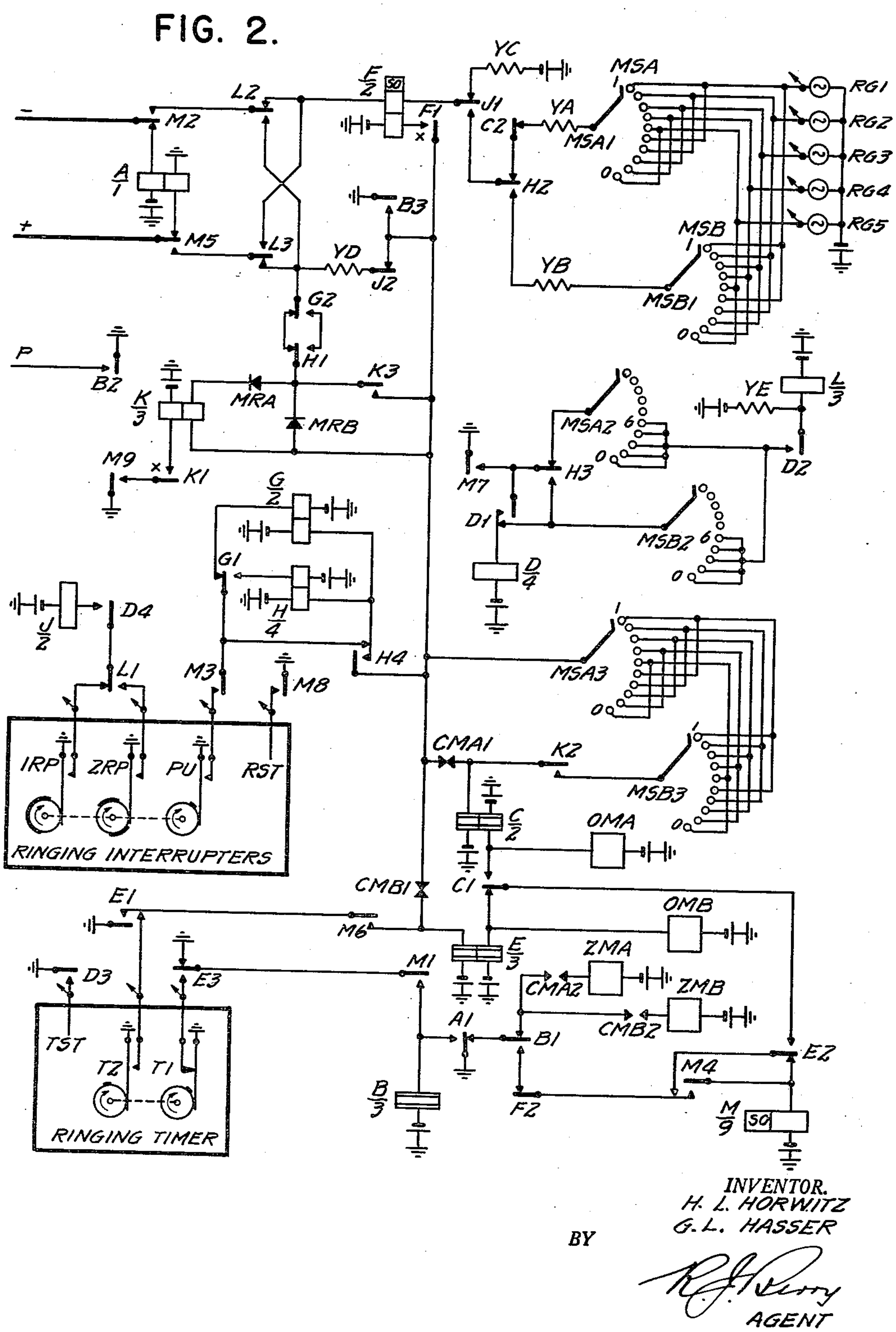
Fig. 2 is a detailed showing of a reverting call ringing circuit according to our invention, and should be placed to the right of Fig. 1 for a proper understanding thereof.

In the drawings, the convention universally adopted for indicating relay contacts detached from their respective relay coils has been employed for simplifying the tracing of the circuits. In this form of showing, a relay such as H, Fig. 2, is given a letter designation placed above a numeral, thus:

$$\frac{H}{4}$$

The numeral indicates the number of contact combinations associated with the relay H, each of these combinations being given a designation consisting of the same letter followed by a numeral, thus: H1, H2, H3 and H4. The contacts associated with any particular relay can then be readily located on the drawings.

Figure 1:
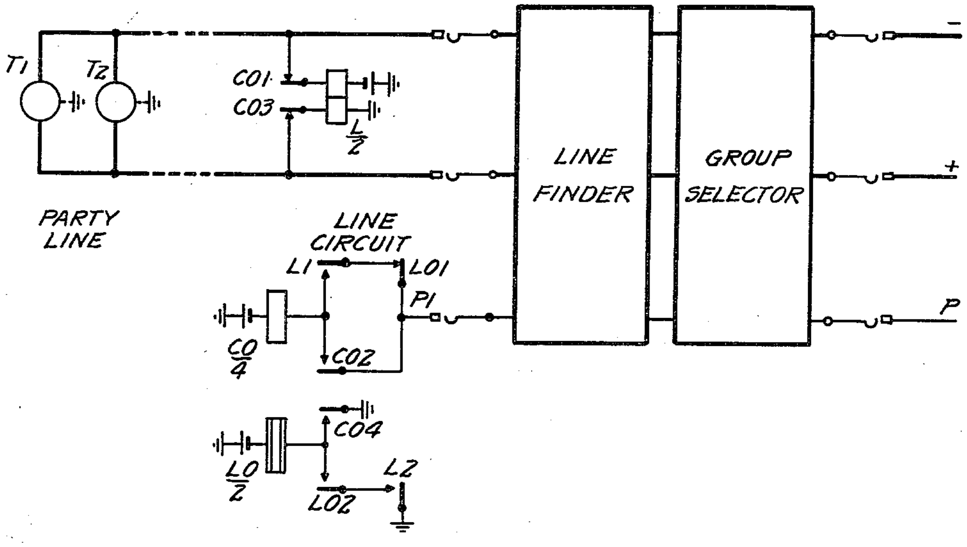
Fig. 1 shows parts of the circuit of a multi-party line and block diagrams of a line finder and a group selector, respectively.

With reference to Fig. 1, a party line having a plurality of stations connected thereto, of which two only, T1 and T2, are shown, is provided at the exchange with a line circuit of conventional "lock-out" type, having a line relay L, a cut-off relay CO and a lock-out relay LO, which is connected to a set of terminal contacts in the bank of each of a group of line finders, of which one only is shown. The line finders may be of any convenient construction suitable for extending calling lines connected to their banks to group selectors. In the preferred embodiment of our invention, the line finder is a conventional step-by-step finder and is accordingly shown in block form and will not be described in detail. Similarly, the group selector is a conventional one or two-digit dial-operated step-by-step selector of the two-motion type and is also shown in block form. It has a plurality of revertive call ringing circuits connected to sets of terminal contacts in its bank, of which one is shown in detail in Fig. 2, connected by trunk conductors "−" and "+" and control conductor P.

When a subscriber at a party line station, for example, station T1, Fig. 1, lifts his handset from the cradle to originate a call, the line relay L operates and causes a line finder, such as the one shown, to place its wipers on the contacts connected to the party line whereafter the cut-off relay CO operates to ground placed on conductor P1, relay L restores, and the line conductors are extended to the group selector shown, all in a manner well known in the art and therefore not described in detail. The line circuit being provided with "lock-out" facilities, the lock-out relay LO also operates. In order to place a reverting call to another station, for example station T2, on the same party line, the calling party dials the one or two digits assigned to this service and the selector proceeds to select a revertive call ringing circuit, such as that shown in Fig. 2, also in a well known manner, and extends the party line conductors to the trunk conductors "−" and "+", and conductor P1 to the control conductor P.

With reference now to Fig. 2, which will be described in greater detail, the revertive call ringing circuit comprises, in addition to a number of relays, a pair of step-by-step switches, MSA and MSB, of the well known "minor" switch type, each having three wipers and corresponding rows of bank contacts, MSA1, 2, 3 and MSB1, 2, 3, an operating magnet, OMA and OMB, a release magnet, ZMA and ZMB, and off-normal contact springs, CMA1, 2 and CMB1, 2, respectively. The contacts of banks MSA1 and MSB1 are each connected to one of five ringing current generators RG1 to RG5, which may be common to a plurality of ringing circuits and generate alternating currents at five different frequencies; contacts 1 and 6 of both banks are connected to generator RG1, contacts 2 and 7 to GR2, etc., for a purpose to be explained.

When the reverting call ringing circuit is seized, as described, the circuit to relay A is closed via the loop at the calling station. A operates and closes the circuit to relay B at make contact A1. B operates, prepares part of the impulsing circuit to the operating magnets OMA and OMB at make contact B1, prepares part of circuits to relays F, G and H and closes the circuit to the operating windings of relays E and C at make contact B3, and places ground on the control conductor P at make contact B2 to make the reverting call circuit busy to other testing selectors and also to hold the preceding switches operated. Relay C operates and prepares the impulsing circuit to its holding winding and magnet OMA in parallel at make contact C1; contact C2 is not effective at this time. Relay E operates also and further prepares the impulsing circuit at make contact E2; contacts E1 and E3 are not effective at this time.

The calling party now dials the "party" digit assigned to his own station, followed by the party digit assigned to the called station. Those stations on each party line having ringers tuned to the frequency of generator RG1 are assigned the party digit 1 or 6, those whose ringers respond to generator RG2 have the digit 2 or 7, etc. The distinction between the stations assigned the party digits 1 to 5 and those assigned the digits 6 to 0 will be explained subsequently.

Relay A follows the first train of impulses received from the dial and each time it restores it opens the circuit to relay B and at break contact A1 closes the impulsing circuit to the holding winding of relay C and to magnet OMA, via the previously closed make contacts B1, E2 and C1. OMA follows the impulses received from A and causes the wipers of switch MSA to rotate step-by-step to the bank contacts corresponding to the digit dialed, thus selecting the calling station's ringing frequency over wiper MSA1 and preparing part of the circuit for applying ringing current to the calling line. At the first step of switch MSA, the off-normal springs CMA1 and CMA2 operate and open the circuit to the operating winding of C and close part of the circuit to the release magnet ZMA, respectively. Relays B and C are slow to release, owing to the presence of copper sleeves on their coil cores and accordingly remain operated during the train of impulses.

After the last impulse of the train, relay A remains operated, re-closing the circuit to relay B and opening the circuit to the holding winding of C and to OMA. Relay C on restoring transfers the impulsing circuit to the holding winding of relay E and magnet OMB in parallel at contacts C1, and prepares part of the circuit for applying ringing current to the calling line at break contact C2.

Relay A follows the second train of impulses received and each time it restores it opens the circuit to relay B and closes the circuit to the holding winding of relay E and to magnet OMB, via break contact C1. OMB follows the impulses received from A and causes the wipers of switch MSB to rotate to the contacts corresponding to the digit dialed, thus selecting the called station's ringing frequency over wiper MSB1 and preparing another part of the circuit for applying ringing current to the line. At the first step of switch MSB, the off-normal springs CMB1 and CMB2 operate and open the circuit to the operating winding of E and close part of the circuit to the release magnet ZMB, respectively. Reray E is slow to release, owing to the presence of a copper sleeve on its coil core and remains operated, together with relay B, during the train of impulses.

After the last impulse of this train, relay A remains operated, re-closing the circuit to relay B and opening the circuit to the holding winding of E and to OMB. Relay E on restoring opens the impulsing circuit and prepares part of the circuit to relay M at transfer contacts E2.

Upon completion of dialing, the calling party replaces his handset on the cradle, thus opening the circuit to relay A. A restores, opens the circuit to relay B and closes the circuit to relay M via break contact E2. Relay M is slow to operate owing to the presence of a copper slug at the armature end of its coil core, to prevent premature operation of relay F. M on operating provides another circuit at make contact M1, under the control of relay E and a ringing timer, to hold relay B, disconnects one winding of relay A from the "—" trunk conductor of break contact M2, connects the interrupter contact PU to the timing relays G and H at make contact M3, opens the circuit to contacts E2 and closes a locking circuit to itself at make-before-break contacts M4, disconnects the other winding of relay A from the "+" trunk conductor at break contact M5, prepares parts of the ringing circuit to the "—" and "+" trunk conductors at make contacts M2 and M5, prepares circuits to relays L and D at make contact M7, connects ground to conductor RST in the ringing interrupters at make contact M8, and prepares a circuit for the re-operation of relay E from the ringing timer at make contact M6.

The ringing interrupters, which may be common to a plurality of reverting call circuits, have the purpose of producing ground pulses to cause the ringing current projected over party lines to be interrupted cyclically in accordance with a "one-ring" or a "two-ring" code, as required, and of ensuring that ringing starts only at the beginning of a code cycle. They may be of any suitable construction and are shown in the form of three cam-operated contacts PU, 1RP and 2RP, providing respectively, in each cycle, preferably of three seconds, a short pick-up pulse, a single pulse for the "one-ring" code and two pulses for the "two-ring" code; the cams are mounted on the same shaft, driven by a motor, not shown, which may be started by applying ground to the conductor RST.

Accordingly, ground from the pick-up contact PU at the beginning of the next ringing cycle closes the circuit to one winding of relay H and to both windings of relay G. G does not operate at this time because the magnetic fields associated with its two windings oppose each other. Relay H operates, however, closes part of the ringing circuit for ringing the called station via the MSB1 bank contact at make contact H2, closes an alternative circuit to its operating winding and to one winding of relay G at make-before-break contacts H4, prepares part of the circuit to relay L via the MSB2 bank contact and closes the circuit to relay D at make contact H3, and disconnects one winding of relay K from the "+" trunk conductor at break contact H1. Relay D operates, closes its own locking circuit at make contact D1, prepares a circuit to relay J at make contact D4, connects relay L to certain of the MSA2 and MSB2 bank contacts at make contact D2, and connects ground to conductor TST at make contact D3.

Relay L operates if switch MSB has been stepped to a position where ground via contacts M7 and H3 is connected to the MSB2 bank contact, and at make contact L3 prepares part of the circuit for applying ringing current to the "+" trunk conductor. If relay L does not operate, at its break contact L2 it prepares part of the circuit for applying ringing current to the "—" trunk conductor. Also, if relay L operates, the circuit to relay J is closed to the "two-ring" pulse interrupter 2RP via contact D4, whereas if L does not operate, the circuit to J is closed to the "one-ring" pulse interrupter 1RP. The contacts of banks MSA2 and MSB2 which are wired to contact D2 are therefore those which correspond to the party digits of the stations which have their ringers connected between the "+" line conductor and ground in the case of a line arranged for divided ringing, and of the stations to which a "two-ring" code is assigned in the case of a line arranged for bridged ringing. In the embodiment shown in Fig. 2, each of these stations has one of the party digits 6, 7, 8, 9 or 0.

When ground is removed by contact PU, the circuit to one winding of relay G is opened, allowing this relay to operate over its other winding. Relay G connects the second winding of relay H to contact PU at make contact G1 and connects one winding of relay K to one of the trunk conductors at make contact G2, via make contact H1 and either break contact L3 and make contact M5 or make contacts L2 and M2.

The next ground pulse from the interrupter contact 1RP or 2RP, as the case may be, closes the circuit to relay J. J operates, closes the ringing circuit at make contact J1, and disconnects resistor YD at break contact J2.

If bridged ringing is utilized on the party line connected at this time to the reverting call ringing circuit, ringing current at the frequency assigned to the called station flows from one of the battery-connected generators RG1—RG5, via a bank contact MSB1, current-limiting resistor YB, make contacts H2 and J1, one winding of relay F, break contact L2 or make contact L3, make contact M2 or M5, the "—" or "+" trunk conductor, the ringer and condenser at the called station, the "+" or "—" trunk conductor, make contact M5 or M2, break contact L3 or make contact L2, make contacts G2 and H1, rectifier MRA and one winding of relay K or rectifier MRB, to ground at make contact B3. Relay K operates on that portion of the ringing current which passes through rectifier MRA, locks at make contact K1 via its second winding, short circuits its operating winding and the two rectifiers at make contact K3 to improve the ringing conditions, and prepares a circuit to re-operate relay C at make contact K2, for a purpose to be described hereafter. The ringer at the called station responds to the ringing current; if there is another station on the line at which the ringer is tuned to the same frequency, that ringer responds also. A copper slug on the coil core of relay F lowers its impedance to prevent the operation of this relay on the ringing current.

If divided ringing is utilized on the party line concerned, ringing current flows in the circuit traced in the preceding paragraph to the ringer and condenser at the called station and returns to the exchange via the ground connection at that station. The ringer at the called station alone responds and relay K, which is not included in the ringing circuit, cannot operate.

The operation or non-operation of relay K during the first ringing period is thus an indication that the party line concerned is arranged for bridged or divided ringing, respectively.

Relay J follows the pulses received from the interrupter contact 1RP or 2RP and applies a "one-ring" code or a "two-ring" code to the line according as relay L is unoperated or operated, thus enabling the party at each of the two stations where the ringer responds, in the case of bridged ringing, to determine whether or not he is being called; in the case of divided ringing, the ringing code has no significance. During each "silent" period, when relay J is unoperated, the connection to the generator is replaced at transfer contacts J1 by a connection to battery via current limiting resistor YC, to permit "tripping" of the ringing during this period also; and at break contact J2 resistor YD is shunted across the winding of relay K and its associated rectifiers MRA and MRB, to absorb condenser discharges from the line when relay J restores.

After one complete cycle of the ringing interrupters, that is, when contacts 1RP and 2RP are both open, contact PU closes again, thus closing the circuit to the second winding of relay H, via make contact G1. H now restores, because the magnetic fields associated with its two windings oppose each other, transfer to contact PU the circuit to its operating winding and to one winding of relay G at contacts H4, transfers the ringing circuit from wiper MSB1 to wiper MSA1 at contacts H2, transfers the circuit to relay L from wiper MSB2 to wiper MSA2 at contacts H3, and again disconnects one winding of relay K from the trunk at make contact H1.

Relay L now takes up a position, operated or unoperated, according to the setting of switch MSA, that is, according as the dialed party digit of the calling party was between 6 and 0 or between 1 and 5, respectively, preparing the ringing circuit to ring the calling party at contacts L2 and L3 and selecting the appropriate ringing code at contacts L1. Relay L is slow to release, by virtue of the resistor YE connected in parallel with its winding, and remains operated during the transfer of contacts H3 if it was previously operated and is not now required to restore.

When contact PU opens again, relay G restores, reconnects one of its windings to contact PU at break contact G1 and once more connects the grounded rectifiers MRA and MRB to one of the trunk conductors at break contact G2, this time via break contact H1.

The next ground pulse from contact 1RP, or two pulses from contact 2RP, as the case may be, operate and release relay J; and this relay, except in one particular case to be described hereafter, closes the ringing circuit, this time from a bank contact MSA1, via current-limiting resistor YA, break contacts C2 and H2, and thence as previously described, and accordingly projects over the party line one or two bursts of ringing current at the frequency assigned to the calling party. The ringer at the calling station responds; if there is another station on the line at which the ringer is tuned to the same frequency, that ringer responds also.

After another complete cycle of the ringing interrupters, contact PU closes, re-operating relay H, and then opens, allowing relay G to re-operate, as before, after which the appropriate ringing current to ring the called party is again projected over the line, in the manner already explained. During the next cycle, with relays H and G both unoperated, the calling station is again rung, whereafter the operations described in this paragraph are repeated.

Thus, the called and calling stations are rung alternately; these operations continue until either the called party answers the call or the calling party, in the event of no reply, removes his own handset from the cradle to trip the ringing and then disconnects to cancel the call. If the calling party abandons the call and ringing continues, the connection is in due course forcibly released by the ringing timer, as will be explained.

The purpose of ringing the calling station as well as the called station is to inform the calling party, after he has replaced his handset on the cradle, that the called station is in fact being rung and to indicate, by the cessation of ringing, the moment when he may again lift the handset and start conversation. However, if it so happens that both stations are connected to a party line arranged for bridged ringing and the ringers thereat are both tuned to the same frequency, then the ringer at the calling station will respond to the ringing current directed at the called station, and vice-versa, as stated above.

In such a case, it is clearly unnecessary, for the above-mentioned purpose, to project ringing current interrupted at the calling party's code at all; indeed, to do so would tend to confuse the called party, who would hear his own code and that of the calling party alternately and might well disregard the call altogether. In order to suppress the ringing current directed at the calling station in this particular case, the switches MSA and MSB are each provided with another wiper, MSA3 and MSB3, respectively; the bank contacts 1 and 6, 2 and 7, etc., of one switch are wired together and to the corresponding bank contacts of the other switch, and the combination is included in the afore-mentioned circuit to re-operate relay C which is prepared by the closure of make contact K2.

In the particular case, therefore, where wipers MSA1 and MSB1 have both been positioned to select the same ringing generator, that is, respectively, on bank contacts 1 and 6, 2 and 7, etc., or vice-versa, and provided relay K has operated during the first ringing of the called station, the circuit to relay C is closed, via contact K2 and bank contacts MSB3 and MSA3, to ground at contact B3. Relay C operates and opens the circuit for ringing the calling station at break contact C2. Thus, both stations are rung repeatedly by the ringing current directed at the called party and that directed at the calling party is suppressed, but only if the party line concerned is arranged for bridged ringing. It is accordingly possible to arrange any individual multi-party line either for fully selective divided ringing or for semi-selective bridged ringing with "one-ring" and "two-ring" codes, as circumstances may dictate, and the flexibility of the system is thereby enhanced.

Figure 3:
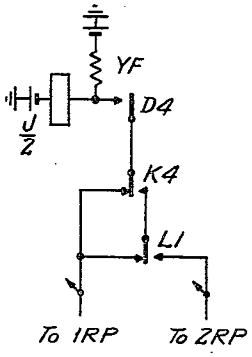
Figs. 3, 4 and 5 show modifications of the circuit of Fig. 2.

It will have been noted that, with the circuit arranged in accordance with Fig. 2, "two-ring" or "one-ring" coded ringing is used, according as relay L does or does not operate, even when the party line concerned is arranged for divided ringing and a single code would suffice. Fig. 3 shows a modification of the circuit whereby the "one-ring" code is used exclusively in connection with such a line. Additional transfer contacts K4 are inserted in the operating circuit to relay J; if relay K remains unoperated, indicating divided ringing, relay J is connected to contact 1RP independently of contacts L1, whereas if relay K operates, indicating bridged ringing, the circuit of relay J is thereafter controlled by contacts L1 as in Fig. 2. To ensure that relay J does not restore during the transfer of contacts K4, a suitable resistor YF is connected in parallel with the winding of J and contact 2RP is adjusted to be closed at the moment relay K operates.

Figure 4:
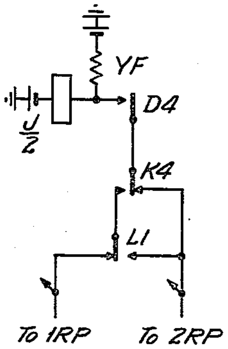

Fig. 4 shows an alternative modification of the circuit of Fig. 2, whereby the "two-ring" code is used exclusively when the party line concerned is arranged for divided ringing. The break contact K4 is connected to contact 2RP; otherwise the modification is the same as in Fig. 3.

With reference again to Fig. 2, it has been stated that when the calling party replaces his handset on the cradle to intitiate the ringing operation, relay M operates, relay A restores and the circuit to relay B is placed under the control of relay E and a ringing timer. The latter, which may be common to a plurality of reverting call ringing circuits, has the purpose of forcing the release of the circuit connected to it if the ringing from that circuit is not tripped within a predetermined time interval. The timer may be of any suitable construction and is shown in the form of two cam-operated contacts, of which one, T1, opens for a short interval during each cam cycle, preferably of two minutes, and the other, T2, closes for a short interval immediately following the re-closure of contact T1; the cams are mounted on the same shaft, driven by a motor, not shown, which may be started by applying ground to conductor TST.

At the moment relay M operates, the circuit to relay B is closed at make contact M1 to ground at break contact E3. At some instant during the ensuing two minutes (the timer having been started, or continued in operation, by the closure of contact D3), contact T2 closes and completes the circuit to relay E, via contact M6. E operates, locks out at make-before-break contacts E1 and transfers the circuit to relay B to contact T1, now closed, at contacts E3. After a further interval of approximately two minutes, contact T1 opens, allowing relay B, if not otherwise held operated, to restore and the ringing circuit releases, as will be explained. Forced release thus occurs between two and four minutes after the start of ringing if the latter is not previously tripped.

If the called party lifts his handset to answer the call within this interval, as is normally the case, a metallic loop is closed across the party line at the called station, in known manner, and direct current flows from ground at contact B3, via resistor YD or rectifier MRB or contact K3, as the case may be, the line loop, one winding of relay F, and either break contact J1 and resistor YC, or make contact J1 and the ringing generator, to battery. Relay F operates its "x" contact F1, thereby closing the circuit to its other winding on which it operates fully, and opens the circuit to relay M at break contact F2. Relay M restores, opens the circuits to relay K at contact M9, to relays G and H at contact M3, to relays D and L at contact M7, to relay B at contact M1, to relay E at contact M6, opens the ringing circuit at make contacts M2 and M5 and reconnects the "+" and "—" trunk conductors to relay A at break contacts M2 and M5. Relays K, L, if operated, restore. Relay K opens the circuit to relay C at contact K2 and this relay, if operated, restores. Relay D restores and opens the circuit to relay J at contact D4 and this relay, if operated, restores. Relay A re-operates over the loop at the called station and re-closes the circuit to relay B, which accordingly remains operated.

The calling party, upon observing that ringing has ceased, also lifts his handset and can now converse with the called party, transmitter feed being furnished to both stations through the windings of relay A.

At the end of conversation, when both parties have replaced their handsets, the circuit to relay A is opened and this relay restores, followed by relays B and F in turn. Circuits are closed to the release magnets ZMA and ZMB of switches SMA and SMB, respectively, via off-normal contacts CMA2 and CMB2 and break contacts B1 and A1, and these switches restore their wipers to normal, whereupon contacts CMA2 and CMB2 open and magnets ZMA and ZMB restore; the ringing circuit is now in the normal condition. When contact B2 opens, ground is removed from the control conductor P of the switch train, releasing the line finder and group selector, Fig. 1, and the relays CO and LO in the line circuit of the party line, in the well known manner.

The multi-party line shown in Fig. 1 is provided with a line circuit arranged to "lock out" the line in the event of a permanent loop condition thereon; the line relay L has two balanced windings, connected to ground and battery respectively, thus adapting the line circuit to furnish transmitter feed to two stations on the line engaged in a reverting call. In these circumstances, it is clearly unnecessary to retain the reverting call ringing circuit and the intervening switches in the connection, once the ringing operation has been terminated. However, in the general case, there will also be party lines connected to the banks of the line finders which are provided with line circuits not arranged with lock-out facilities; when a reverting call is made on such a line, it is of course necessary to maintain the connection to the reverting call ringing circuit throughout conversation. In the general case, therefore, the ringing circuit operates in the manner described, whatever the type of party line circuit involved.

Figure 5:
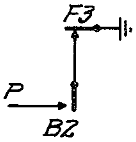

If all the party lines connected to the banks of the line finders are provided with line circuits with lock-out facilities, the revertive call ringing circuit can be arranged to cause its own release and that of the switch train at the moment the ringing is tripped; Fig. 5 shows a modification of the circuit of Fig. 2 whereby this may be achieved. An additional break contact F3 is inserted between contact B2 and ground. When relay F operates, as described, to trip the ringing, ground is removed from the control conductor P, releasing the line finder and group selector and allowing the cut-off relay CO of the party line to restore. The line circuit is thereby placed in the "lock-out" condition, with relays L and LO operated in the well-known manner, which need not be further described herein, and conversation between the parties may proceed. Upon the release of the switch train, relay A, Fig. 2, restores and the ringing circuit is restored to normal as described in the preceding paragaph.

It will be appreciated by those versed in the art that the invention is not limited to the precise arrangements which have been described, but that modifications may be made coming within the scope of the appended claims.

What is claimed is:

1. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to another station on said one party line, and means in said reverting call ringing circuit responsive to a ringing signal transmitted over said connection but only responsive when said line is arranged for bridged ringing for determining whether said party line is arranged for divided or for bridged ringing.

2. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to another station on said one party line, a source of ringing current, means in said reverting call ringing circuit for closing a path for ringing current from said source to said party line to ring at least one of the stations thereon, and discriminating means included in a portion of said path for determining whether said party line is arranged for divided or for bridged ringing, said portion of said path being used only when said party line is arranged for bridged ringing.

3. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to another station on said one party line, a source of ringing current having a first pole and a second pole, means in said reverting call ringing circuit for closing a path for ringing current from said first pole to one side of said party line to ring at least one of the stations thereon, a first return path for said ringing current from ground to said second pole and a second return path for said ringing current from the other side of said party line to said second pole, and discriminating means included in said second path for determining whether said party line is arranged for divided or for bridged ringing.

4. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to a second station on said one party line, a relay in said reverting call ringing circuit for determining whether said party line is arranged for divided or for bridged ringing, a plurality of sources of ringing current of differing frequencies, contacting devices each for interrupting said ringing current according to a different ringing code, and means, responsive jointly to impulses dialed from said first station and to said relay, for applying ringing current from one of said sources of the proper frequency to the proper side of said party line to ring said second station in the case that said party line is arranged for divided ringing, and for applying to said party line ringing current from one of said sources of the proper frequency and interrupted according to the proper ringing code to ring said second station in the case that said party line is arranged for bridged ringing.

5. A telephone system according to claim 4, in which said means for applying ringing current comprises a multi-position switch having a first and a second wiper and contact bank, means for positioning said switch in accordance with said dialed impulses, a connection from each contact of said first contact bank to one of said sources, a switching relay connected to selected ones of the contacts of said second contact bank, and a connection including a contact of said switching relay from said first wiper to each side of said party line.

6. A telephone system according to claim 5, in which said means for applying ringing current further comprises a connecting relay having a contact included in each of said last-mentioned connections, and a connection from said connecting relay including a contact of said switching relay to each of said contacting devices.

7. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to a second station on said one party line, a relay in said reverting call ringing circuit for determining whether said party line is arranged for divided or for bridged ringing, a plurality of sources of ringing current of differing frequencies, contacting devices each for interrupting said ringing current according to a different ringing code, and means responsive jointly to impulses dialed from said first station and to said relay, for applying ringing current from one of said sources of the proper frequency to the proper side of said party line to ring said second station in the case that said party line is arranged for divided ringing, said ringing current being interrupted invariably according to a particular one of said ringing codes, and for applying to said party line ringing current from one of said sources of the proper frequency and interrupted according to the proper ringing code to ring said second station in the case that said party line is arranged for bridged ringing.

8. In an automatic telephone system, party lines arranged for divided ringing, party lines arranged for bridged ringing, stations on said party lines, a reverting call ringing circuit, selector switches for setting up a connection from a first station on any one of said party lines to said reverting call ringing circuit when a reverting call is made from said first station to a second station on said one party line, a relay in said reverting call ringing circuit for determining whether said party line is arranged for divided or for bridged ringing, a plurality of sources of ringing current of differing frequencies, contacting devices each for interrupting said ringing current according to a different ringing code, and means responsive jointly to impulses dialed from said first station and to said relay, for applying ringing currents from said sources of the proper frequencies to the proper sides of said party line to ring said first and second stations alternately in the case that said party line is arranged for divided ringing, and for applying to said party line ringing currents from said sources of the proper frequencies and interrupted according to the proper ringing codes to ring said first and second stations alternately in the case that said party line is arranged for bridged ringing.

9. A telephone system according to claim 8, in which said reverting call ringing circuit further comprises discriminating means, effective only when said party line is arranged for bridged ringing, for preventing the application to said party line of ringing current interrupted according to the proper ringing code to ring said first station when one and the same ringing current frequency is the proper frequency to ring both said first and said second stations.

10. A telephone system according to claim 8, in which said reverting call ringing circuit further comprises timing means for causing the severance of said connection and the release of said reverting call ringing circuit if said reverting call is neither answered at said second station nor cancelled from said first station within a predetermined time interval.

References Cited in the file of this patent

UNITED STATES PATENTS

| | | |
|---|---|---|
| 1,487,996 | Williams | Mar. 25, 1924 |
| 2,411,525 | Deakin | Nov. 26, 1946 |
| 2,628,281 | Morris | Feb. 10, 1953 |